(12) United States Patent
Nara et al.

(10) Patent No.: US 6,768,840 B2
(45) Date of Patent: Jul. 27, 2004

(54) ARRAYED WAVEGUIDE GRATING AND METHOD FOR MANUFACTURING THE SAME

(75) Inventors: Kazutaka Nara, Tokyo (JP); Kazhuhisa Kashihara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 405 days.

(21) Appl. No.: 10/020,220

(22) Filed: Dec. 18, 2001

(65) Prior Publication Data

US 2002/0136492 A1 Sep. 26, 2002

(30) Foreign Application Priority Data

Jan. 16, 2001 (JP) ........................................ 2001-007867
May 14, 2001 (JP) ........................................ 2001-142859

(51) Int. Cl.$^7$ ............................. G02B 6/34; G02B 6/26
(52) U.S. Cl. ......................... 385/37; 385/46; 385/132; 385/15
(58) Field of Search .......................... 385/14, 24, 37, 385/46, 43, 50, 51, 15, 129–132; 398/84, 87

(56) References Cited

U.S. PATENT DOCUMENTS 5,940,555 A * 8/1999 Inaba et al. ................. 385/24
6,222,956 B1 * 4/2001 Akiba et al. ................. 385/24
6,298,186 B1 * 10/2001 He ............................. 385/37

FOREIGN PATENT DOCUMENTS

| JP | 7-333447 | 12/1995 |
| JP | 9-189825 | 7/1997 |

OTHER PUBLICATIONS

K. Okamoto, et al., Optics Letters, vol. 20, No. 1, pp. 43–45, "Arrayed–Waveguide Grating Multiplexer with Flat Spectral Response", Jan. 1, 1995.

* cited by examiner

*Primary Examiner*—Hemang Sanghavi
(74) *Attorney, Agent, or Firm*—Oblon, Spivak, McClelland, Maier & Neustadt, P.C.

(57) ABSTRACT

An arrayed waveguide grating including at least one first optical waveguide, a first slab waveguide, an arrayed waveguide, a second slab waveguide and a plurality of second optical waveguides. The arrayed waveguide is connected to the first optical waveguide via the first slab waveguide. The arrayed waveguide includes a plurality of channel waveguides each of which has a different length. The plurality of second optical waveguides are connected to the arrayed waveguide via the second slab waveguide. A number of the plurality of channel waveguides is determined such that a crosstalk is at most a predetermined value.

18 Claims, 9 Drawing Sheets

NUMBER OF CHANNEL WAVEGUIDS IN THE ARRAYED WAVEGUIDE

ARRAYED WAVEGUIDE GRATING AND METHOD FOR MANUFACTURING THE SAME

CROSS-REFERENCES TO RELATED APPLICATIONS

The present application claims priority under 35 U.S.C. § 119 to Japanese Patent Application No. 2001-007867, filed Jan. 16, 2001, entitled "Arrayed Waveguide Grating," and Japanese Patent Application No. 2001-142859, filed May 14, 2001, entitled "Arrayed Waveguide Grating". The contents of these applications are incorporated herein by reference in their entirety.

BACKGROUND OF THE INVENTION

1. Field of the Invention

The present invention relates to an arrayed waveguide grating and a method for manufacturing the arrayed waveguide grating.

2. Discussion of the Background

Recently, in optical communications, research and development of the optical wavelength division multiplexing transmission has been conducted actively for the way to dramatically increase the transmission capacity thereof, and practical applications have been proceeding. The optical wavelength division multiplexing transmission is that a plurality of lights having a wavelength different from each other are multiplexed and are transmitted, for example. Such optical wavelength division multiplexing transmission systems need optical multiplexer/demultiplexers for demultiplexing light having a wavelength different from each other or multiplexing lights having a wavelength different from each other. As one example of such optical multiplexer/demultiplexers, an arrayed waveguide grating (AWG) is known.

SUMMARY OF THE INVENTION

According to one aspect of the present invention, an arrayed waveguide grating includes at least one first optical waveguide, a first slab waveguide, an arrayed waveguide, a second slab waveguide and a plurality of second optical waveguides. The arrayed waveguide is connected to the first optical waveguides via the first slab waveguide. The arrayed waveguide includes a plurality of channel waveguides each of which has a different length. The plurality of second optical waveguides are connected to the arrayed waveguide via the second slab waveguide. A number of the plurality of channel waveguides is determined such that a crosstalk is at most a predetermined value.

According to another aspect of the present invention, an arrayed waveguide grating includes at least one first optical waveguide, a first slab waveguide, an arrayed waveguide, a second slab waveguide and a plurality of second optical waveguides. The arrayed waveguide is connected to the first optical waveguides via the first slab waveguide. The arrayed waveguide includes a plurality of channel waveguides each of which has a different length. The plurality of second optical waveguides are connected to the arrayed waveguide via the second slab waveguide. A number of the plurality of channel waveguides is determined such that optical amplitude distribution at an interface between the first slab waveguide and the at least one first optical waveguide is substantially reproduced at interfaces between the second slab waveguide and the plurality of second optical waveguides.

According to further aspect of the present invention, an arrayed waveguide grating includes at least one first optical waveguide, a first slab waveguide, an arrayed waveguide, a second slab waveguide and a plurality of second optical waveguides. The arrayed waveguide is connected to the at least one first optical waveguide via the first slab waveguide. The arrayed waveguide includes a plurality of channel waveguides each of which has a different length. The plurality of second optical waveguides are connected to the arrayed waveguide via the second slab waveguide. An optical transmittance of the arrayed waveguide grating has gaussian-shaped wavelength dependency. A number of the plurality of channel waveguides is determined such that optical amplitude distribution transmitted in the arrayed waveguide includes only main beam and first side lobes which appear on both sides of the main beam.

According to the other aspect of the present invention, an arrayed waveguide grating includes at least one first optical waveguide, a first slab waveguide, an arrayed waveguide, a second slab waveguide and a plurality of second optical waveguides. The arrayed waveguide is connected to the first optical waveguide via the first slab waveguide. The arrayed waveguide includes a plurality of channel waveguides each of which has a different length. The plurality of second optical waveguides are connected to the arrayed waveguide via the second slab waveguide. An optical transmittance of the arrayed waveguide grating has rectangular-shaped wavelength dependency. A number of the plurality of channel waveguides is determined such that optical amplitude distribution transmitted in the arrayed waveguide includes only main beam, first side lobes which appear on both sides of the main beam, and second side lobes each appearing on an outer side of each of the first side lobes.

According to further aspect of the present invention, a method for manufacturing an arrayed waveguide grating includes providing at least one first optical waveguide, providing a first slab waveguide, and providing an arrayed waveguide to be connected to the at least one first optical waveguide via the first slab waveguide. The arrayed waveguide includes a plurality of channel waveguides each of which has a different length. Further, the method includes providing a second slab waveguide, and providing a plurality of second optical waveguides to be connected to the arrayed waveguide via the second slab waveguide. A number of the plurality of channel waveguides is determined such that a crosstalk is at most a predetermined value.

According to yet another aspect of the present invention, a method for manufacturing an arrayed waveguide grating includes providing at least one first optical waveguide, providing a first slab waveguide, and providing an arrayed waveguide to be connected to the at least one first optical waveguide via the first slab waveguide. The arrayed waveguide includes a plurality of channel waveguides each of which has a different length. Further, the method includes providing a second slab waveguide, and providing a plurality of second optical waveguides to be connected to the arrayed waveguide via the second slab waveguide. A number of the plurality of channel waveguides is determined such that optical amplitude distribution at an interface between the first slab waveguide and the at least one first optical waveguide is substantially reproduced at interfaces between the second slab waveguide and the plurality of second optical waveguides.

According to further aspect of the present invention, a method for manufacturing an arrayed waveguide grating includes providing at least one first optical waveguide, providing a first slab waveguide, and providing an arrayed waveguide to be connected to the at least one first optical waveguide via the first slab waveguide. The arrayed waveguide includes a plurality of channel waveguides each of which has a different length. Further, the method includes providing a second slab waveguide, and providing a plurality of second optical waveguides to be connected to the arrayed waveguide via the second slab waveguide. The arrayed waveguide grating has an optical transmittance having gaussian-shaped wavelength dependency. A number of the plurality of channel waveguides is determined such that optical amplitude distribution transmitted in the arrayed waveguide includes only main beam and first side lobes which appear on both sides of the main beam.

According to further aspect of the present invention, a method for manufacturing an arrayed waveguide grating includes providing at least one first optical waveguide, providing a first slab waveguide, and providing an arrayed waveguide to be connected to the at least one first optical waveguide via the first slab waveguide. The arrayed waveguide includes a plurality of channel waveguides each of which has a different length. Further, the method includes providing a second slab waveguide, and providing a plurality of second optical waveguides to be connected to the arrayed waveguide via the second slab waveguide. The arrayed waveguide grating has an optical transmittance having rectangular-shaped wavelength dependency. A number of the plurality of channel waveguides is determined such that optical amplitude distribution transmitted in the arrayed waveguide includes only main beam, first side lobes which appear on both sides of the main beam, and second side lobes each appearing on an outer side of each of the first side lobes.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE EMBODIMENTS

Figure 1:
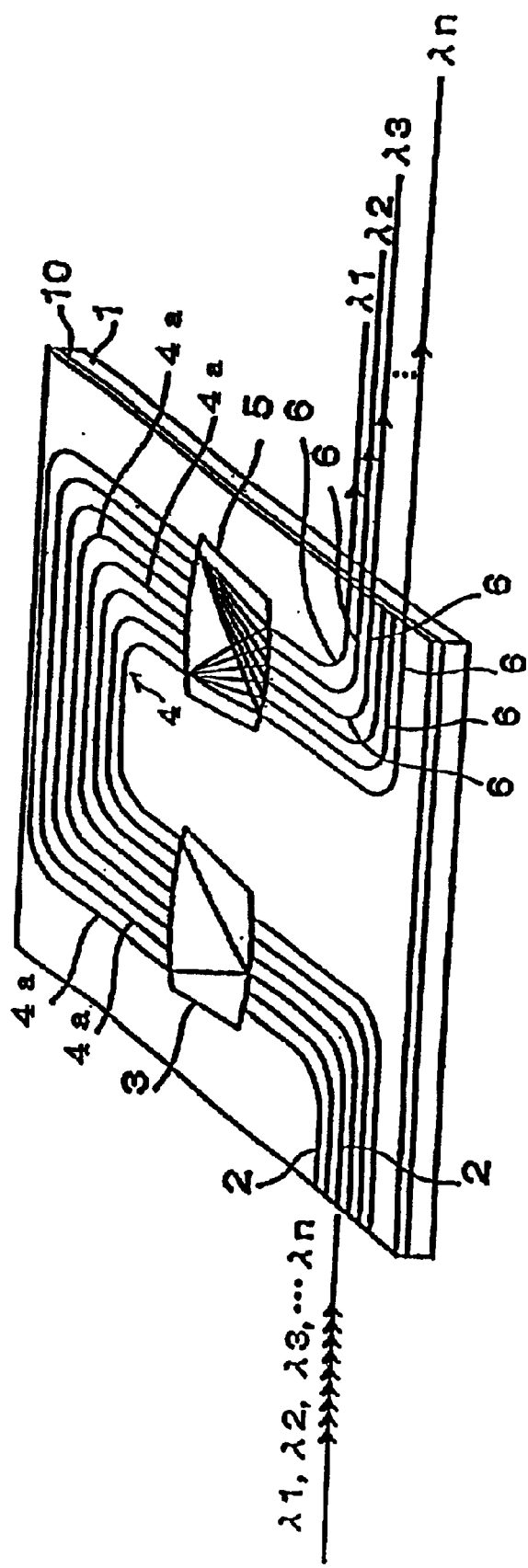
FIG. 1 depicts a schematic diagram illustrating one example of a waveguide pattern of the arrayed waveguide grating.

The embodiments will now be described with reference to the accompanying drawings, wherein like reference numerals designate corresponding or identical elements throughout the various drawings.

The arrayed waveguide grating is that a waveguide pattern as shown in FIG. 1 is formed on a substrate 1, for example. Referring to FIG. 1, the waveguide pattern is formed to have at least one of optical input waveguides (at least one first optical waveguide) 2 arranged side by side, a first slab waveguide 3 connected to the outgoing side of the optical input waveguides 2, an arrayed waveguide 4 connected to the outgoing side of the first slab waveguide 3, a second slab waveguide 5 connected to the outgoing side of the arrayed waveguide 4, and a plurality of optical output waveguides (second optical waveguides) 6 which are arranged side by side and which are connected to the outgoing side of the second slab waveguide 5.

The arrayed waveguide 4 propagates light that has been lead through the first slab waveguide 3. The arrayed waveguide 4 includes a plurality of channel waveguides (4a) arranged side by side. The length of the adjacent channel waveguides (4a) varies each other by a predetermined length (ΔL).

Additionally, the optical output waveguides 6 are disposed corresponding to the number of signal lights having a different wavelength each other, the signal lights are demultiplexed by the arrayed waveguide grating, for example. The channel waveguides (4a) that constitute the arrayed waveguide 4 are generally disposed in multiple such as three hundreds. However, in FIG. 1, the number of the channel waveguides (4a), the optical output waveguides 6 and the optical input waveguides 2 are schematically depicted to simplify the drawing.

For example, the transmitting side of optical fibers is connected to the optical input waveguides 2 to lead multiplexed light. The light that has been lead to the first slab waveguide 3 through one of the optical input waveguides 2 and is diffracted by the diffraction effects enters the arrayed waveguide 4.

The light that has propagated through the arrayed waveguide 4 reaches the second slab waveguide 5. Then, the lights having a different wavelength are focused at the optical output waveguides 6 to be outputted. At this time, the length of the adjacent channel waveguides (4a) of the arrayed waveguide 4 varies each other by the predetermined length. Thus, a shift is generated in the phase of the respective lights having a different wavelength after propagating through the arrayed waveguide 4. According to this shifted amount, the phasefront of these lights is tilted. This tilted angle determines the positions at which the lights are focused. Therefore, the positions at which the lights having a different wavelength are focused differ from each other. On this account, the optical output waveguides 6 are formed on the position at which the lights are focused and thereby the lights having a different wavelength can be outputted from the different optical waveguides 6 at every wavelength.

For example, as shown in FIG. 1, when multiplexed light having wavelengths λ1, λ2, λ3, . . . , and λn (n is an integer of two or greater) is inputted from one of the optical input waveguides 2, this light is diffracted at the first slab waveguide 3 to reach the arrayed waveguide 4. Then, they pass through the arrayed waveguide 4 and the second slab waveguide 5, are focused at different positions according to wavelengths and enter the optical output waveguides 6 different from each other, as set forth. Then, each of lights passes through the respective optical output waveguides 6 and is outputted from the output end of the optical output waveguides 6. An optical fiber for outputting light is connected to the output end of each of the optical output waveguides 6 and thereby each of the lights having a different wavelength is removed through the optical fiber.

In this arrayed waveguide grating, the improvement of the wavelength resolution of the diffraction grating is in proportion to a length difference (ΔL) of each of the channel waveguides (4a) of the arrayed waveguide 4. Therefore, the ΔL is designed large and thereby the optical multiplexing/demultiplexing lights having a narrow wavelength spacing is made possible. Accordingly, the function of multiplexing and demultiplexing a plurality of lights, that is, the function of multiplexing or demultiplexing a plurality of lights having a narrow wavelength spacing can be served, which is needed to realize the high-density optical wavelength division multiplexing transmission.

An arrayed waveguide grating shown in FIG. 1 is obtained by forming the waveguide pattern mentioned above on a substrate 1 made of silicon (Si), for example, in the following manner.

First, an under cladding film (the principle constituent is $SiO_2$) and a core film (glass whose principle constituent is $GeO_2$-doped $SiO_2$, for example) are formed on the silicon substrate 1 one by one to form by the flame hydrolysis deposition method subsequently to consolidate. Then, the core film is patterned by photolithography and dry etching to form the waveguide described above. Subsequently, the waveguide pattern of the core film is covered to deposit an over cladding film by the flame hydrolysis deposition method, after that to consolidate, then the arrayed waveguide grating is fabricated.

The arrayed waveguide gratings as described above include a "gaussian type arrayed waveguide grating" and a "flat type arrayed waveguide grating". The gaussian type arrayed waveguide grating has the optical transmittance having gaussian-shaped wavelength dependency. The flat type arrayed waveguide grating has the optical transmittance having rectangular-shaped wavelength dependency.

Figure 10:
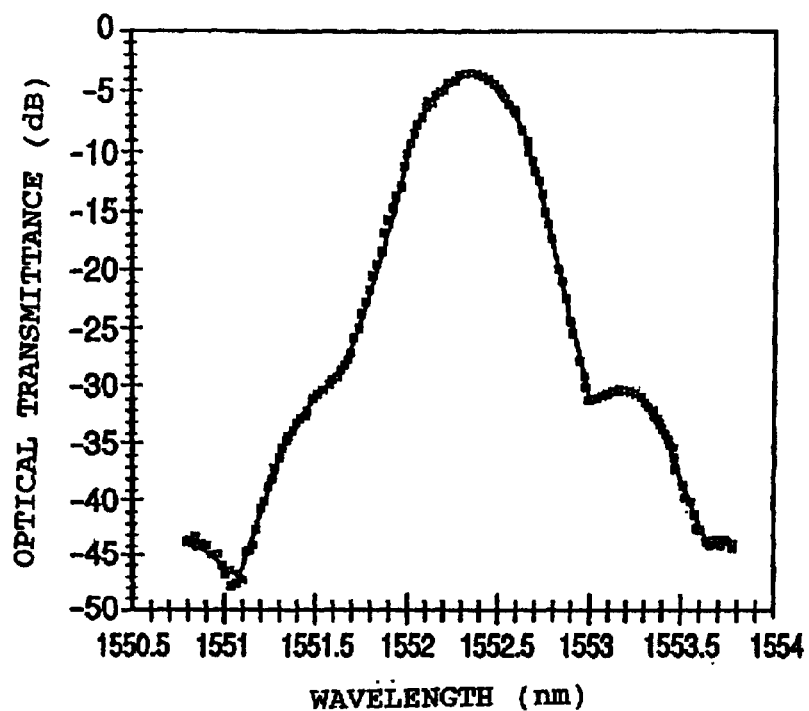
FIG. 10 depicts a graph illustrating the transmitted spectrum of a conventional gaussian type arrayed waveguide grating.

Conventionally, the gaussian type arrayed waveguide grating (100 GHz-16 channel gaussian type arrayed waveguide grating) that multiplexes and demultiplexes 16-wavelengths at interval of 100 GHz (it is about 0.8 nm when converted to a wavelength basis) has been fabricated by using parameters shown in Table 1, for example. FIG. 10 depicts the wavelength dependency of the optical transmittance of the gaussian type arrayed waveguide grating fabricated according to the parameters in Table 1.

TABLE 1

| Parameter | Design value |
| --- | --- |
| Number of wavelengths | 16 |
| Channel spacing | 100 GHz |
| Free spectral range (FSR) | 25.86 nm (for 32 waves) |
| Focal length of the first and second slab waveguides | 9245.3 μm |
| Channel waveguide optical pass length difference ΔL | 63.06 μm |
| Diffraction order | 59 |
| Number of channel waveguides | 206 |

Figure 11:
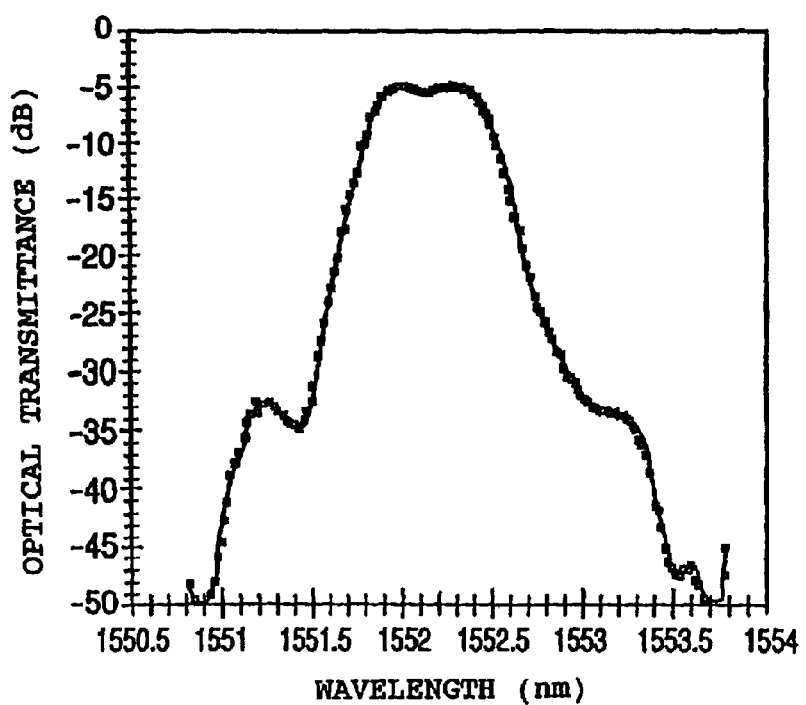
FIG. 11 depicts a graph illustrating the transmitted spectrum of a conventional flat type arrayed waveguide grating.

Additionally, the flat type arrayed waveguide grating (100 GHz-16 channel flat type arrayed waveguide grating) that multiplexes and demultiplexes 16-wavelengths at intervals of 100 GHz has been fabricated by using parameters shown in Table 2, for example. FIG. 11 shows the wavelength dependency of the optical transmittance of the flat type arrayed waveguide grating fabricated according to the parameters in Table 2.

TABLE 2

| Parameter | Design value |
| --- | --- |
| Number of wavelengths | 16 |
| Channel spacing | 100 GHz |
| Free spectral range (FSR) | 25.86 nm (for 32 waves) |
| Focal length of the first and second slab waveguides | 13580.1 μm |
| Channel waveguide optical pass length difference ΔL | 63.06 μm |
| Diffraction order | 59 |
| Number of channel waveguides | 303 |

However, with respect to the wavelength dependencies of the optical transmittance in the conventional arrayed waveguide grating, the transmitted spectrum is broadened in the gaussian type arrayed waveguide grating and the flat type arrayed waveguide grating, as shown in FIGS. 10 and 11.

Accordingly, in both of the conventional gaussian type arrayed waveguide grating and the conventional flat type arrayed waveguide grating, isolations between the adjacent channels are not sufficient and the crosstalk is approximately −23 dB to −24 dB.

When the arrayed waveguide grating is adopted as the wavelength miltiplexer/demultiplexer in the wavelength division multiplexing transmission, it is substantially important to suppress the crosstalk between the adjacent channels. Generally, the wavelength division multiplexing transmission system requires the adjacent crosstalk of, for example, about −26 dB or less.

In both the gaussian type arrayed waveguide grating and the flat type arrayed waveguide grating, the optical amplitude distribution in the interface between one of the optical input waveguides and the first slab waveguide is Fourier-transformed. Then, the Fourier transform pattern of the optical amplitude distribution is formed in the arrayed waveguide having the plurality of the channel waveguides arranged side by side.

As described above, the lengths of the adjacent channel waveguide of the arrayed waveguide are different from each other by the predetermined length. Because of this, a shift is generated in the phase of the respective lights after propagating through the arrayed waveguide. The phasefront of these lights is tilted according to this shifted amount and the lights are focused in the direction orthogonal to the phase-front at every wavelength. On this account, in theory, the optical amplitude distribution in the interface between one of the optical input waveguides and the first slab waveguide is substantially reproduced in the interface between the second slab waveguide and the output waveguides.

However, in the optical path from one of the optical input waveguides to the optical output waveguides, the lights in fact propagate as they are influenced by the fabrication errors of the arrayed waveguide grating.

When the influences of the fabrication errors (process errors in fabrication) of the arrayed waveguide grating are described specifically, the followings are named. First, the light diffracted from one of the optical input waveguides is fluctuated due to the refractive index and the film thickness fluctuation inside the first slab waveguide. Secondly, phase errors are generated due to the refractive index and the film thickness and width (the width of the channel waveguides) fluctuations inside the arrayed waveguide grating. Thirdly, when the light emitted from the arrayed waveguide is focused on the output waveguides, pattern defocus is generated due to the refractive index and the film thickness fluctuation inside the second slab waveguide.

As influenced by such process errors in fabricating the arrayed waveguide grating, the optical amplitude distribution in the interface between one of the optical input waveguides and the first slab waveguide is not fully reproduced in the interface between the second slab waveguide and the optical output waveguides. On this account, the conventional arrayed waveguide grating has the wavelength dependencies of the optical transmittance as shown in FIGS. 10 and 11, and the adjacent crosstalk is deteriorated.

The inventors have been conducted various studies because the inventors thought that the influences by the arrayed waveguide is particularly great among the process errors as described above. Consequently, the inventors found that the influences of the process errors may be reduced by setting the number of the channel waveguides of the arrayed waveguide properly.

That is, the inventors found that the influences of the process errors may be suppressed by determining the number of the channel waveguides of the arrayed waveguide appropriately. In other words, the inventors confirmed that the number of the channel waveguides is defined appropriately and thereby the optical amplitude distribution in the interface between one of the optical input waveguides and the first slab waveguide can be substantially reproduced in the interface between the second slab waveguide and the optical output waveguides, and that the deterioration of the adjacent crosstalk in the arrayed waveguide grating can be suppressed.

The inventors determined the proper value for the number of the channel waveguides in both the gaussian type arrayed waveguide grating and the flat type arrayed waveguide grating by the following manner.

Figure 6A:
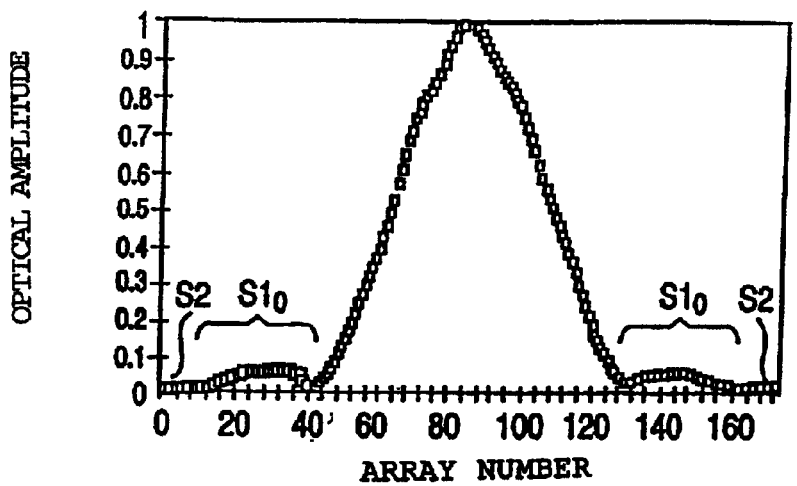
FIGS. 6A to 6C depict graphs illustrating optical amplitude distributions inside the arrayed waveguide in gaussian type arrayed waveguide gratings where the number of channel waveguides is different from each other.
Figure 6B:
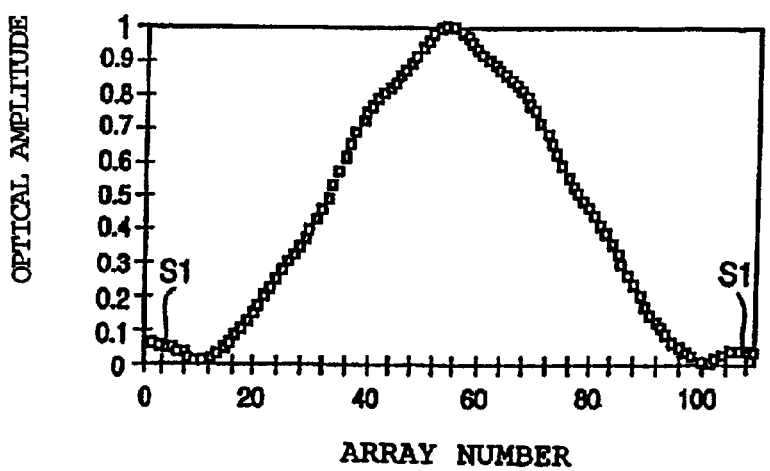
Figure 6C:
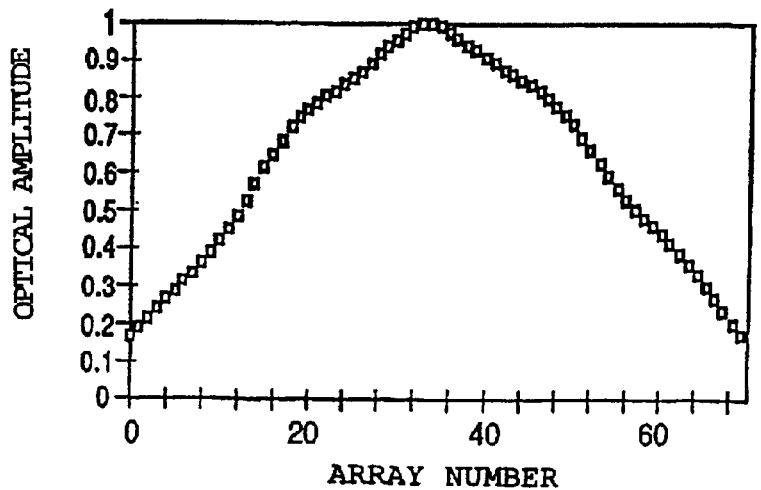

The inventors first considered determining the number of the channel waveguides in the gaussian type arrayed waveguide grating. The inventors fabricated gaussian type arrayed waveguide gratings having 175, 110 and 70 channel waveguides where only the number of the channel waveguides are varied to measure the optical amplitude distributions in the gaussian type arrayed waveguide gratings having the parameters in Table 1. FIGS. 6A, 6B and 6C show the measurement results, respectively. In addition, each of the drawings shows that the arrangement order of the channel waveguides is set to array numbers and the optical amplitude distribution is normalized as the value at the peak is set one.

Figure 7:
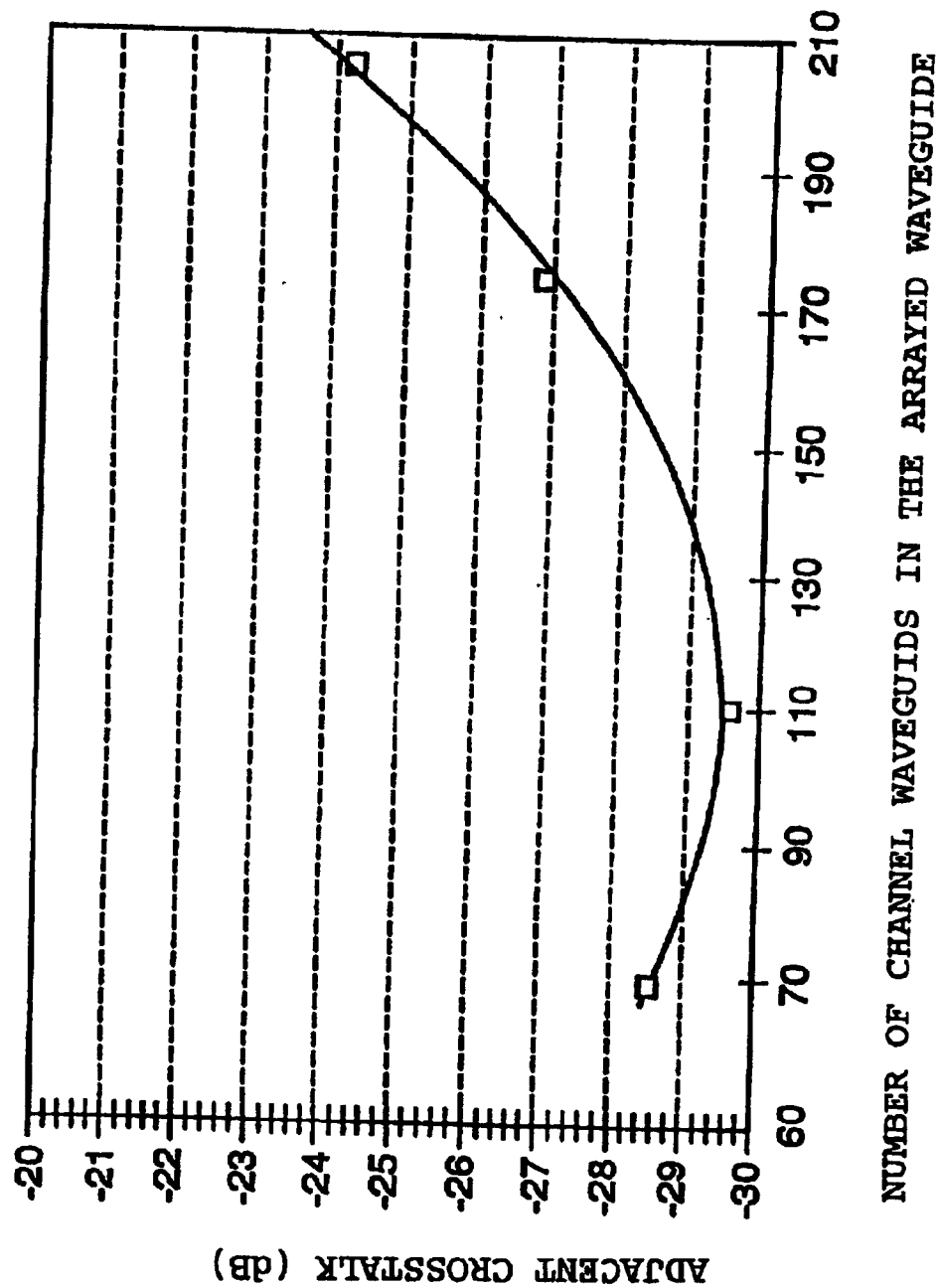
FIG. 7 depicts a graph illustrating the difference of the adjacent crosstalk in the gaussian type arrayed waveguide gratings where the number of the channel waveguides is different from each other.

The adjacent crosstalk was obtained on these three types of gaussian type arrayed waveguide gratings and the conventional gaussian type arrayed waveguide grating having about 206 channel waveguides and the relationship between the number of the channel waveguides and the adjacent crosstalk of the gaussian type arrayed waveguide gratings was considered. FIG. 7 shows the result.

In these gaussian type arrayed waveguide gratings, it was found that when the number of the channel waveguides is excessive such as 175, the optical amplitude distribution reproduced in the interface between the second slab waveguide and the optical output waveguides is greatly influenced by the extra part of the Fourier transform pattern of the optical amplitude distribution that is disturbed due to the process errors described above and is shown in FIG. 6A. In this case, the optical transmittance of the gaussian type arrayed waveguide gratings is as shown in FIG. 10 in which the transmitted spectrum is spread.

On the other hand, in the gaussian type arrayed waveguide gratings, it was found that when the number of the channel waveguides is too small such as 70, a part of information of the main beam in the Fourier transform pattern of the optical amplitude distribution happens to be cut deliberately, as shown in FIG. 6C. Therefore, it was found that the Fourier transform pattern of the optical amplitude distribution is formed into another pattern different from the original pattern.

On the contrary, according to an embodiment of the present invention, as shown in FIG. 6B, the number of the channel waveguides is determined such that optical amplitude distribution transmitted in the arrayed waveguide includes only main beam and first side lobes (S1) which appear on both sides of the main beam. The optical amplitude distribution transmitted in the arrayed waveguide may include a part or an entirety (S1o) of the first side lobes (S1). However, the optical amplitude distribution does not include second side lobes (S2). Accordingly, the optical amplitude distribution in the interface between one of the optical input waveguides and the first slab waveguide is substantially reproduced in each of interfaces between the second slab waveguide and the optical output waveguides in the gaussian type arrayed waveguide gratings. Consequently, the adjacent crosstalk in the gaussian type arrayed waveguide grating may be improved.

Figure 12:
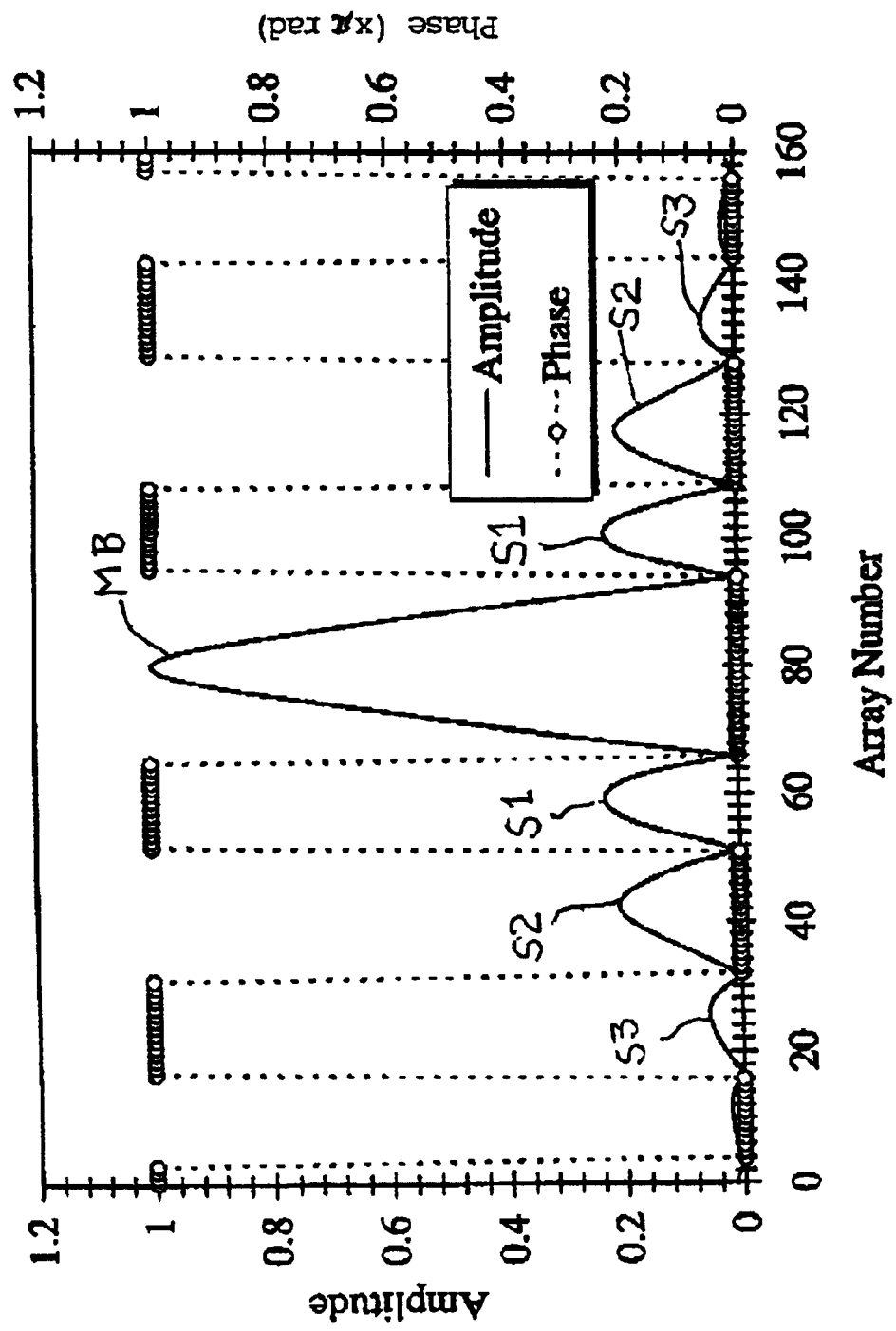
FIG. 12 illustrates optical amplitude distributions inside the arrayed waveguide for explaining the main beam and side lobes.

Referring to FIG. 12, the main beam and side lobes are explained. FIG. 12 is one example for the purpose of explaining the main beam and side lobes. Referring to FIG. 12, the center beam (MB) which has the highest peak is the main beam. Two beams (S1) which appear on both sides of the main beam (MB) and which have the second highest peaks are the first side lobes. Further, the phase of the main beam (MB) is different from the phases of the first side lobes (S1) by 180 degrees. Two beams (S2) each of which appears on an outer side of each of the first side lobes (S1) and which have the third highest peaks are the second side lobes. Further, the phases of the second side lobes (S2) are different from the phases of the first side lobes (S1) by 180 degrees. Two beams (S3) each of which appears on an outer side of each of the second side lobes (S2) and which have the fourth highest peaks are the third side lobes. Further, the phases of the third side lobes (S3) are different from the phases of the second side lobes (S2) by 180 degrees.

According to the present embodiment of the present invention, in the gaussian type arrayed waveguide gratings, the number of the channel waveguides is determined such that optical amplitude distribution transmitted in the arrayed waveguide includes only main beam and first side lobes (S1).

According to the present embodiment of the present invention, the number of the channel waveguides is determined such that a crosstalk is at most a predetermined value. The predetermined value is, for example, about −26 dB.

According to the present embodiment of the present invention, the number of the channel waveguides is determined such that optical amplitude distribution at an interface between the first slab waveguide and one of the at least one first optical waveguide is substantially reproduced at an interface between the second slab waveguide and the plurality of second optical waveguides.

Therefore, the adjacent crosstalk in the gaussian type arrayed waveguide grating may be improved.

Figure 8:
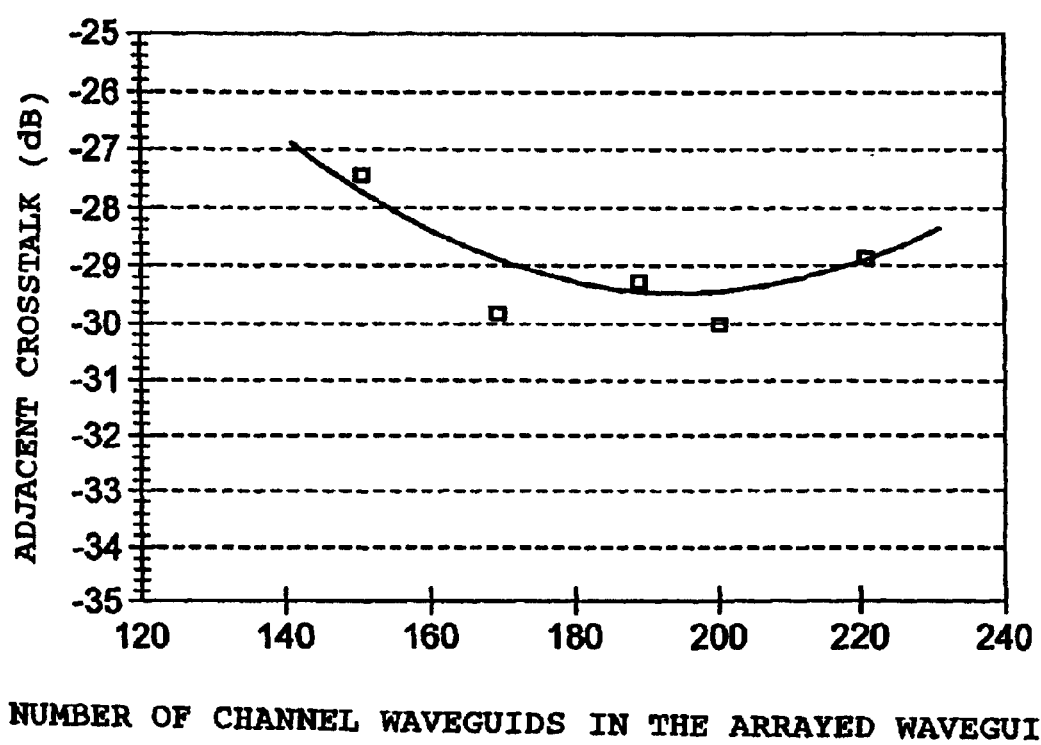
FIG. 8 depicts a graph illustrating the difference of the adjacent crosstalk in flat type arrayed waveguide gratings where the number of channel waveguides is different from each other.

Next, in order to determine the configuration in the flat type arrayed waveguide grating, the inventors fabricated a plurality of flat type arrayed waveguide gratings only different in the number of the channel waveguides among the parameters in Table 2 and experimentally studied how the values of the adjacent crosstalk change. FIG. 8 shows the result. According to the result shown in FIG. 8, it was found that when the number of the channel waveguides is reduced lower than the value (303 waveguides) of the conventional example shown in Table 2, the values of the adjacent crosstalk are improved, whereas when the number of the channel waveguides is reduced too many, the values of the adjacent crosstalk are deteriorated.

That is, in the flat type arrayed waveguide grating, it was found that the number of the channel waveguides has the optimum value as well. In the study result shown in FIG. 8, it was found that the number of the channel waveguides of the flat type arrayed waveguide grating is set nearly 200 and thereby the adjacent crosstalk can be made minimum.

Figure 9A:
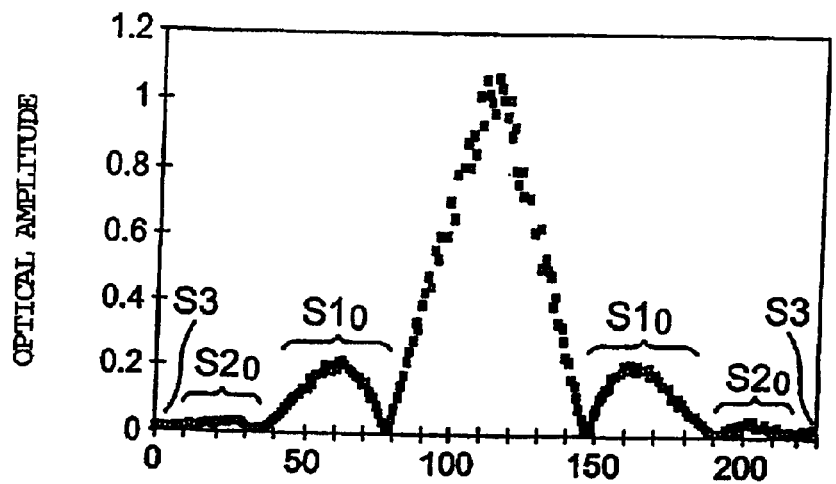
FIGS. 9A to 9C depict graphs illustrating optical amplitude distributions inside the arrayed waveguide in the flat type arrayed waveguide gratings where the number of the channel waveguides is different from each other.
Figure 9B:
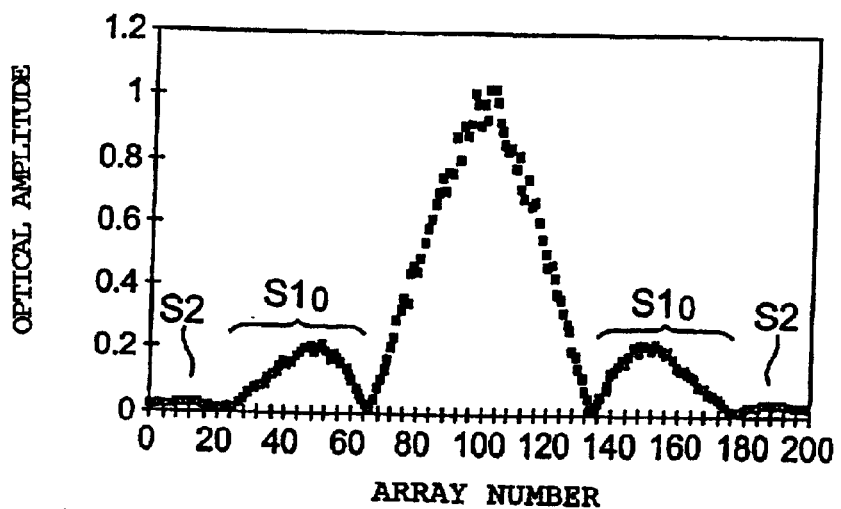
Figure 9C:
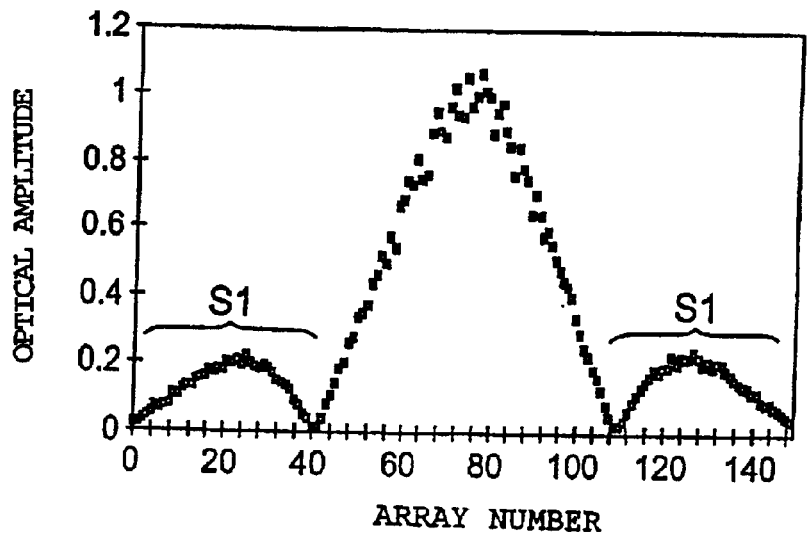

Additionally, in the flat type arrayed waveguide grating having the parameters shown in Table 2, the flat type arrayed waveguide gratings where only the number of the channel waveguides are varied to 225, 200, 150 were fabricated and the optical amplitude distribution was measured. FIGS. 9A, 9B and 9C show the measurement results, respectively. Besides, the arrangement order of the channel waveguides is set to array numbers and the normalized optical amplitude distribution is shown.

According to the measurement results shown in these drawings, it was found that when the number of the channel waveguides is excessive such as 225, the optical amplitude distribution reproduced in the interface between the second slab waveguide and the optical output waveguides is greatly influenced by the extra part of the Fourier transform pattern of the optical amplitude distribution that is disturbed due to the process errors described above and is shown in FIG. 9A in the flat type arrayed waveguide grating. In this case, the optical transmittance of the flat type arrayed waveguide grating is as shown in FIG. 11 in which the transmitted spectrum is spread.

On the other hand, when the number of the channel waveguides is too small such as 150, a part of information of the first side lobe (S1) in the Fourier transform pattern of the optical amplitude distribution happens to be cut deliberately, as shown in FIG. 9C in the flat type arrayed waveguide gratings. On this account, it was found that the Fourier transform pattern of the optical amplitude distribution is formed into another pattern different from the original pattern.

According to an embodiment of the present invention, as shown in FIG. 9B, in the flat type arrayed waveguide grating, the number of the channel waveguides is determined such that optical amplitude distribution transmitted in the arrayed waveguide includes only main beam, first side lobes which appear on both sides of the main beam, and second side lobes each appearing on an outer side of each of the first side lobes. The optical amplitude distribution transmitted in the arrayed waveguide may include a part or an entirety (S2o) of the second side lobes (S2). However, the optical amplitude distribution does not include third side lobes (S3). Accordingly, the optical amplitude distribution in the interface between one of the optical input waveguides and the first slab waveguide is substantially reproduced in the interface between the second slab waveguide and the optical output waveguides in the flat type arrayed waveguide gratings. Consequently, the adjacent crosstalk in the flat type arrayed waveguide grating may be improved.

According to the present embodiment of the present invention, in the flat type arrayed waveguide gratings, the number of the channel waveguides is determined such that optical amplitude distribution transmitted in the arrayed waveguide includes only main beam, first side lobes and second side lobes.

According to the present embodiment of the present invention, the number of the channel waveguides is determined such that a crosstalk is at most a predetermined value. The predetermined value is, for example, about −26 dB.

According to the present embodiment of the present invention, the number of the channel waveguides is determined such that optical amplitude distribution at an interface between the first slab waveguide and one of the at least one first optical waveguide is substantially reproduced at an interface between the second slab waveguide and the plurality of second optical waveguides.

Therefore, the adjacent crosstalk in the flat type arrayed waveguide grating may be improved.

Specific examples are the following arrayed waveguide gratings of Example 1 and Example 2, for example. The arrayed waveguide grating of Example 1 is the gaussian type arrayed waveguide grating. The number of the channel waveguides is determined such that optical amplitude distribution transmitted in the arrayed waveguide includes only main beam and first side lobes.

Additionally, the arrayed waveguide grating of Example 2 is the flat type arrayed waveguide grating. The number of the channel waveguides is determined such that optical amplitude distribution transmitted in the arrayed waveguide includes only main beam, first side lobes which appear on both sides of the main beam, and second side lobes each appearing on an outer side of each of the first side lobes.

Hereafter, the configurational examples of these Examples 1 and 2 will be described in detail on the separated cases.

EXAMPLE 1

The arrayed waveguide grating of Example 1 has parameters shown in Table 3. The arrayed waveguide grating of Example 1 was fabricated by applying the method previously described. In Example 1, the parameters in Table 3 were adopted for fabricating a photomask pattern.

TABLE 3

| Parameter | Design value |
| --- | --- |
| Number of wavelengths | 16 |
| Channel spacing | 100 GHz |
| Free spectral range (FSR) | 25.86 nm (for 32 waves) |

TABLE 3-continued

| Parameter | Design value |
| --- | --- |
| Focal length of the first and second slab waveguides | 9245.3 µm |
| Channel waveguide optical pass length difference ΔL | 63.06 µm |
| Diffraction order | 59 |
| Number of channel waveguides | 111 |

Figure 2:
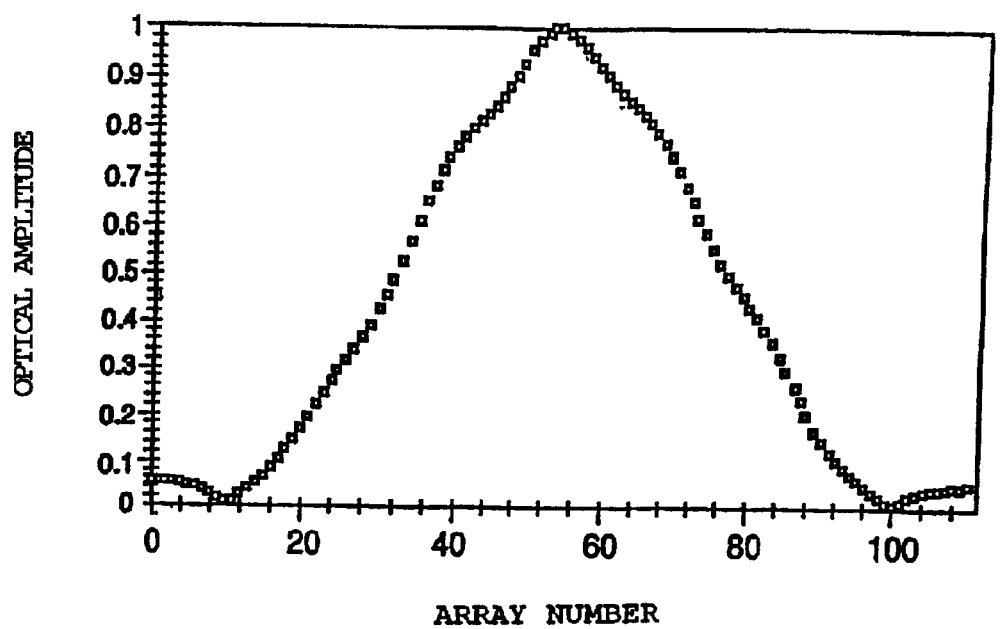
FIG. 2 depicts a graph illustrating an optical amplitude distribution inside the arrayed waveguide in one embodiment (Example 1) of the invention.
Figure 3:
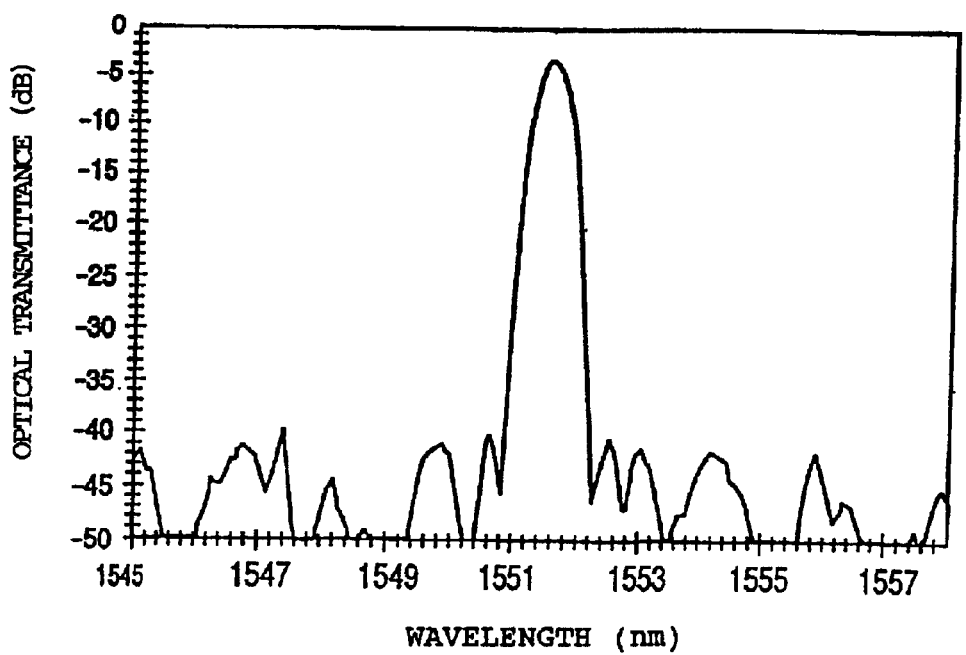
FIG. 3 depicts a graph illustrating the transmitted spectrum of Example 1.

FIG. 2 depicts the optical amplitude distribution inside the arrayed waveguide in the arrayed waveguide grating of Example 1. In addition, FIG. 3 depicts the transmitted spectrum of the arrayed waveguide grating of Example 1. As apparent from FIG. 3, the arrayed waveguide grating of Example 1 was formed to be a substantially excellent arrayed waveguide grating having the adjacent crosstalk of about −30 dB.

EXAMPLE 2

The arrayed waveguide grating of Example 2 has parameters shown in Table 4. The arrayed waveguide grating of Example 2 was fabricated by applying the method previously described. In Example 2, the parameters in Table 4 were adopted for fabricating a photomask pattern.

TABLE 4

| Parameter | Design value |
| --- | --- |
| Number of wavelengths | 16 |
| Hannel spacing | 100 GHz |
| Free spectral range (FSR) | 25.86 nm (for 32 waves) |
| Focal length of the first and second slab waveguides | 13580.1 µm |
| Channel waveguide optical pass length difference ΔL | 63.06 µm |
| Diffraction order | 59 |
| Number of channel waveguides | 200 |

Figure 4:
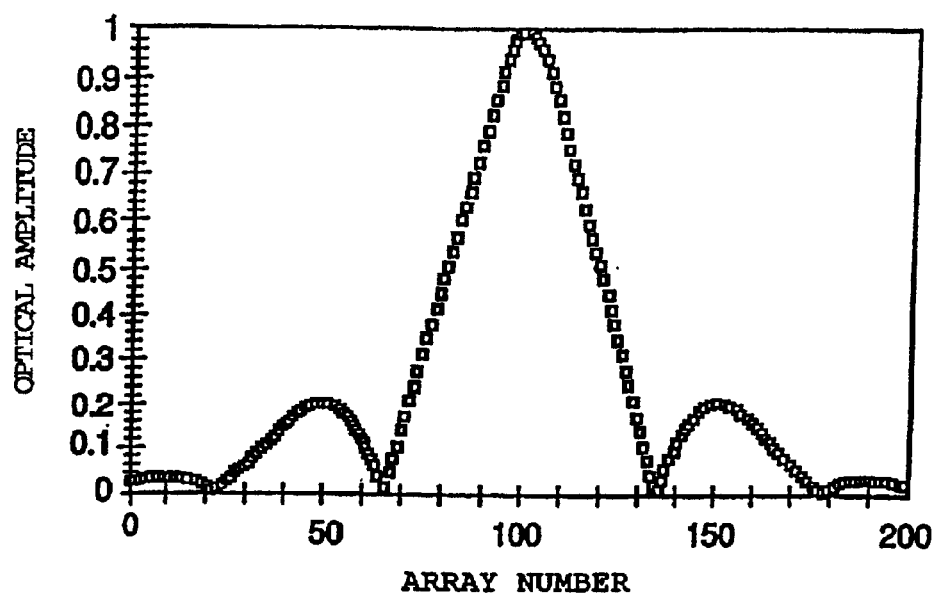
FIG. 4 depicts a graph illustrating an optical amplitude distribution inside the arrayed waveguide in another embodiment (Example 2) of the invention.
Figure 5:
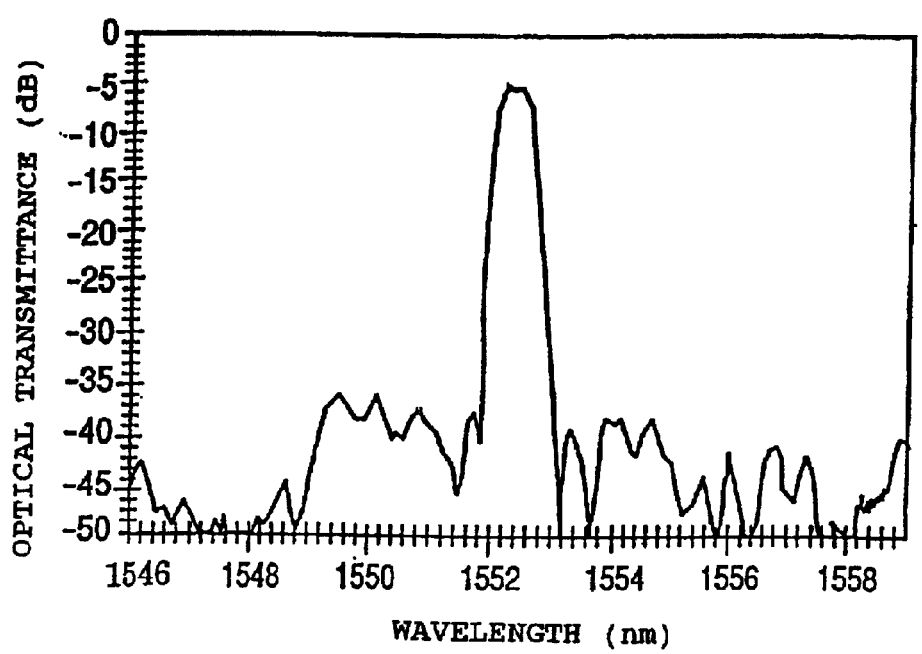
FIG. 5 depicts a graph illustrating the transmitted spectrum of Example 2.

FIG. 4 depicts the optical amplitude distribution inside the arrayed waveguide in the arrayed waveguide grating of Example 2. In addition, FIG. 5 depicts the transmitted spectrum of the arrayed waveguide grating of Example 2. As clear from FIG. 5, the arrayed waveguide grating of Example 2 was formed to be a substantially excellent arrayed waveguide grating having the adjacent crosstalk of about −31 dB.

The invention is not limited to each of the embodiments described above, which can adopt various embodiments. For example, the number of the channel waveguides was set 111 in Example 1 and the number of the channel waveguides was set 200 in Example 2. However, the number of the channel waveguides may be set arbitrarily according to the number of the wavelengths of the arrayed waveguide grating or an amount of the optical transmittance bandwidth.

Moreover, each of the parameters in the arrayed waveguide grating is not limited to the parameters shown in Examples 1 and 2, which can be set arbitrarily. In both cases of the gaussian type and the flat type, by properly determining the number of the channel waveguides (4a), crosstalk may be improved.

In the above embodiments, although the arrayed waveguide grating is utilyzed as a demultiplexer, the arrayed waveguide grating may also be utilyzed as a multiplexer. In such a case, lights are input from the second optical waveguides 6 and multiplexed light is output from one of the first optical waveguides 2.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An arrayed waveguide grating comprising:
   at least one first optical waveguide;
   a first slab waveguide;
   an arrayed waveguide connected to said at least one first optical waveguide via said first slab waveguide, said arrayed waveguide comprising a plurality of channel waveguides each of which has a different length;
   a second slab waveguide; and
   a plurality of second optical waveguides connected to said arrayed waveguide via said second slab waveguide,
   wherein a number of the plurality of channel waveguides is determined such that a crosstalk is at most a predetermined value.

2. An arrayed waveguide grating according to claim 1, wherein said predetermined value is about −26 dB.

3. An arrayed waveguide grating comprising:
   at least one first optical waveguide;
   a first slab waveguide;
   an arrayed waveguide connected to said at least one first optical waveguide via said first slab waveguide, said arrayed waveguide comprising a plurality of channel waveguides each of which has a different length;
   a second slab waveguide; and
   a plurality of second optical waveguides connected to said arrayed waveguide via said second slab waveguide,
   wherein a number of the plurality of channel waveguides is determined such that optical amplitude distribution at an interface between the first slab waveguide and one of the at least one first optical waveguide is substantially reproduced at interfaces between the second slab waveguide and the plurality of second optical waveguides.

4. An arrayed waveguide grating comprising:
   at least one first optical waveguide;
   a first slab waveguide;
   an arrayed waveguide connected to said at least one first optical waveguide via said first slab waveguide, said arrayed waveguide comprising a plurality of channel waveguides each of which has a different length;
   a second slab waveguide; and
   a plurality of second optical waveguides connected to said arrayed waveguide via said second slab waveguide,
   wherein an optical transmittance of the arrayed waveguide grating has gaussian-shaped wavelength dependency, and
   wherein a number of the plurality of channel waveguides is determined such that optical amplitude distribution transmitted in the arrayed waveguide includes only main beam and first side lobes which appear on both sides of the main beam.

5. An arrayed waveguide grating according to claim 4, wherein the number of the plurality of channel waveguides is determined such that the optical amplitude distribution includes only the main beam and a part of the first side lobes.

6. An arrayed waveguide grating according to claim 4, wherein the number of the plurality of channel waveguides is determined such that the optical amplitude distribution includes only the main beam and an entirety of the first side lobes.

7. An arrayed waveguide grating comprising:

at least one first optical waveguide;

a first slab waveguide;

an arrayed waveguide connected to said at least one first optical waveguide via said first slab waveguide, said arrayed waveguide comprising a plurality of channel waveguides each of which has a different length;

a second slab waveguide; and a plurality of second optical waveguides connected to said arrayed waveguide via said second slab waveguide, wherein an optical transmittance of the arrayed waveguide grating has rectangular-shaped wavelength dependency, and wherein a number of the plurality of channel waveguides is determined such that optical amplitude distribution transmitted in the arrayed waveguide includes only main beam, first side lobes which appear on both sides of the main beam, and second side lobes each appearing on an outer side of each of the first side lobes.

8. An arrayed waveguide grating according to claim 7, wherein the number of the plurality of channel waveguides is determined such that the optical amplitude distribution includes only the main beam, the first side lobes and a part of the second side lobes.

9. An arrayed waveguide grating according to claim 7, wherein the number of the plurality of channel waveguides is determined such that the optical amplitude distribution includes only the main beam, the first side lobes and an entirety of the second side lobes.

10. A method for manufacturing an arrayed waveguide grating, comprising:

providing at least one first optical waveguide;

providing a first slab waveguide;

providing an arrayed waveguide to be connected to said at least one first optical waveguide via said first slab waveguide, said arrayed waveguide comprising a plurality of channel waveguides each of which has a different length;

providing a second slab waveguide; and providing a plurality of second optical waveguides to be connected to said arrayed waveguide via said second slab waveguide; and determining a number of the plurality of channel waveguides such that a crosstalk is at most a predetermined value.

11. A method according to claim 10, wherein said predetermined value is about −26 dB.

12. A method for manufacturing an arrayed waveguide grating, comprising:

providing at least one first optical waveguide;

providing a first slab waveguide;

providing an arrayed waveguide to be connected to said at least one first optical waveguide via said first slab waveguide, said arrayed waveguide comprising a plurality of channel waveguides each of which has a different length;

providing a second slab waveguide;

providing a plurality of second optical waveguides to be connected to said arrayed waveguide via said second slab waveguide; and determining a number of the plurality of channel waveguides such that optical amplitude distribution at an interface between the first slab waveguide and one of the at least one first optical waveguide is substantially reproduced at interfaces between the second slab waveguide and the plurality of second optical waveguides.

13. A method for manufacturing an arrayed waveguide grating, comprising:

providing at least one first optical waveguide;

providing a first slab waveguide;

providing an arrayed waveguide to be connected to said at least one first optical waveguide via said first slab waveguide, said arrayed waveguide comprising a plurality of channel waveguides each of which has a different length;

providing a second slab waveguide;

providing a plurality of second optical waveguides to be connected to said arrayed waveguide via said second slab waveguide;

providing the arrayed waveguide grating with an optical transmittance having gaussian-shaped wavelength dependency; and determining a number of the plurality of channel waveguides such that optical amplitude distribution transmitted in the arrayed waveguide includes only main beam and first side lobes which appear on both sides of the main beam.

14. A method according to claim 13, wherein the number of the plurality of channel waveguides is determined such that the optical amplitude distribution includes only the main beam and a part of the first side lobes.

15. A method according to claim 13, wherein the number of the plurality of channel waveguides is determined such that the optical amplitude distribution includes only the main beam and an entirety of the first side lobes.

16. A method for manufacturing an arrayed waveguide grating, comprising:

providing at least one first optical waveguide;

providing a first slab waveguide;

providing an arrayed waveguide to be connected to said at least one first optical waveguide via said first slab waveguide, said arrayed waveguide comprising a plurality of channel waveguides each of which has a different length;

providing a second slab waveguide;

providing a plurality of second optical waveguides to be connected to said arrayed waveguide via said second slab waveguide;

providing the arrayed waveguide grating with an optical transmittance having rectangular-shaped wavelength dependency; and determining a number of the plurality of channel waveguides such that optical amplitude distribution transmitted in the arrayed waveguide includes only main beam, first side lobes which appear on both sides of the main beam, and second side lobes each appearing on an outer side of each of the first side lobes.

17. A method according to claim 16, wherein the number of the plurality of channel waveguides is determined such that the optical amplitude distribution includes only the main beam, the first side lobes and a part of the second side lobes.

18. A method according to claim 16, wherein the number of the plurality of channel waveguides is determined such that the optical amplitude distribution includes only the main beam, the first side lobes and an entirety of the second side lobes.

* * * * *